(12) United States Patent
Sato (10) Patent No.: US 11,898,383 B2
(45) Date of Patent: Feb. 13, 2024

(54) HOOD LOCK DEVICE

(71) Applicant: MITSUI KINZOKU ACT CORPORATION, Yokohama (JP)

(72) Inventor: Kumiko Sato, Yokohama (JP)

(73) Assignee: MITSUI KINZOKU ACT CORPORATION, Yokohama (JP)

( * ) Notice: Subject to any disclaimer, the term of this patent is extended or adjusted under 35 U.S.C. 154(b) by 95 days.

(21) Appl. No.: 17/442,753

(22) PCT Filed: Apr. 2, 2020

(86) PCT No.: PCT/JP2020/015242
§ 371 (c)(1),
(2) Date: Sep. 24, 2021

(87) PCT Pub. No.: WO2020/250551
PCT Pub. Date: Dec. 17, 2020

(65) Prior Publication Data
US 2022/0178179 A1    Jun. 9, 2022

(30) Foreign Application Priority Data
Jun. 12, 2019  (JP) .................................. 2019-109674

(51) Int. Cl.
E05B 83/24  (2014.01)
E05B 85/10  (2014.01)
E05C 3/24   (2006.01)

(52) U.S. Cl.
CPC .............. *E05B 83/24* (2013.01); *E05B 85/10* (2013.01); *E05C 3/24* (2013.01)

(58) Field of Classification Search
CPC ........ E05B 83/24; E05B 85/10; Y10S 292/27; Y10S 292/0894; E05C 3/24
See application file for complete search history.

(56) References Cited

U.S. PATENT DOCUMENTS 1,954,062 A * 4/1934 Walter ...................... G05G 1/12
                                            16/DIG. 30
1,965,354 A * 7/1934 Patock .................... A47J 45/10
                                            220/759
(Continued)

FOREIGN PATENT DOCUMENTS

DE    102009052782 A1 *  5/2011  ............. E05B 79/20
DE    102013003672 A1 *  3/2014  ............. E05B 83/24
(Continued)

OTHER PUBLICATIONS

International Searching Authority, "International Search Report," issued in connection with International Patent Application No. PCT/JP2020/015242, dated Jun. 23, 2020.
(Continued)

*Primary Examiner* — Carlos Lugo
(74) *Attorney, Agent, or Firm* — Foley & Lardner LLP (57) ABSTRACT

A hood lock device has a base plate having a striker groove, a primary latch configured to fasten a hood in a totally closed state, and a secondary latch, the secondary latch has a latch main body of steel and a handle of resin, and the latch main body has a forcing meshing portion configured to come into engagement with a striker passing across a half opening position and moving to a totally closing position and to be pressed in a latching direction opposite to an unlatching direction by the striker in a case that a hook portion configured to lock the striker recedes from the striker groove and a mounting portion provided adjacent to the forcing meshing portion and on which the handle is mounted.

5 Claims, 9 Drawing Sheets

(56) References Cited

U.S. PATENT DOCUMENTS

| | | | | |
|---|---|---|---|---|
| 2,133,252 | A * | 10/1938 | Moore | A47J 45/071 220/759 |
| 2,252,855 | A * | 8/1941 | Lasch | F16B 2/248 403/329 |
| 3,749,434 | A * | 7/1973 | Gley | E05B 83/243 292/228 |
| 3,878,584 | A * | 4/1975 | Witte | A47J 45/071 220/752 |
| 4,189,248 | A * | 2/1980 | Sully | F16D 1/08 16/DIG. 30 |
| 5,088,781 | A * | 2/1992 | Ono | E05B 1/04 292/DIG. 64 |
| 5,853,060 | A * | 12/1998 | Chao | E05B 83/16 292/216 |
| 6,109,670 | A * | 8/2000 | Tomaszewski | E05B 83/24 292/216 |
| 10,842,326 | B2 * | 11/2020 | Munari | A47J 45/061 |
| 11,105,126 | B2 * | 8/2021 | Ogawase | E05B 77/36 |
| 2013/0221685 | A1 * | 8/2013 | Polewarczyk | E05B 83/243 292/52 |
| 2018/0066461 | A1 | 3/2018 | Nieto et al. | |
| 2018/0230719 | A1 * | 8/2018 | Ogawase | E05B 77/36 |
| 2020/0071971 | A1 * | 3/2020 | Cho | E05B 83/24 |

FOREIGN PATENT DOCUMENTS

| | | | |
|---|---|---|---|
| EP | 1420135 A2 * | 5/2004 | E05B 63/0056 |
| EP | 3 363 974 A1 | 8/2018 | |
| FR | 2926580 A1 * | 7/2009 | E05B 79/20 |
| FR | 2954386 A1 * | 6/2011 | E05B 83/24 |
| GB | 1567416 A * | 5/1980 | B62D 25/12 |
| JP | 2006/009393 A | 1/2006 | |
| JP | 2011174246 A * | 9/2011 | |
| JP | 5523138 B2 | 6/2014 | |
| JP | 2016079573 A * | 5/2016 | |
| KR | 0171807 B1 * | 2/1998 | |
| KR | 100528592 B1 * | 11/2005 | |

OTHER PUBLICATIONS

International Searching Authority, "Written Opinion," issued in connection with International Patent Application No. PCT/JP2020/015242, dated Jun. 23, 2020.

* cited by examiner

HOOD LOCK DEVICE

CROSS-REFERENCE TO RELATED APPLICATIONS

The present application claims priority under 37 U.S.C. § 371 to International Patent Application No. PCT/JP2020/015242, filed Apr. 2, 2020, which claims priority to and the benefit of Japanese Patent Application No. 2019-109674, filed on Jun. 12, 2019. The contents of these applications are hereby incorporated by reference in their entireties.

TECHNICAL FIELD

The present invention relates to a hood lock device.

BACKGROUND ART

A hood lock device is used for a vehicle such as an automobile to fasten a hood by locking a striker provided on the hood. As a hood lock device of this type, there is known a hood lock device including a primary latch configured to fasten a hood in a fully closed state and a secondary latch configured to fasten the hood in a half opened state. In the event that the fastening of the hood by the primary latch is erroneously released while a vehicle is running, the secondary latch prevents the hood from being opened fully (for example, refer to PTL 1).

CITATION LIST

Patent Literature
PTL 1: Japanese Patent No. 5523138

SUMMARY OF INVENTION

Problem To Be Solved By Invention

A release handle is provided on the secondary latch, and the release handle is operated through a gap defined between the hood and a vehicle body with the hood resting in the half opened state. As a result, the shape of the release handle differs from vehicle type to vehicle type (vehicle types, sizes, and the like). However, the secondary latch is desired to be made uniform in configuration from the viewpoint of reducing the production costs of the hood lock device.

In the hood lock device described in PTL 1, a lock lever (the secondary latch) for fastening the hood in the half opened state includes a lever portion having a hook for locking a striker and an operation portion. The lever portion and the operation portion are both made from a synthetic resin and made up of different members. The operation portion differs from vehicle type to vehicle type, and different lever portions are attached to the lever portion, so that the lever portion is used for a plurality of vehicle types. However, in the case that the lever portion and the operation portion are made up of the different members, an impact repeatedly acts on a connecting portion that connects the lever portion and the operation portion together every time the hood is opened and closed, resulting in a concern that the connecting portion is damaged by the impact acting thereon.

The present invention provides a hood lock device having a superior durability.

Solution to Problem

One aspect of the present disclosure provides a hood lock device including: a base plate fixed to a vehicle body and having a striker groove into which a striker provided on a hood that is opened from and closed towards the vehicle body enters in response to a closing action of the hood; a primary latch configured to fasten the hood in a totally closed state by locking the striker in a totally closing position in the striker groove; and a secondary latch configured to fasten the hood in a half opened state by locking the striker in a half opening position situated closer to an opening side of the striker groove than the totally closing position, wherein the secondary latch includes: a latch main body, which is made of steel, and which is rotatable relative to the base plate, the latch main body being configured to cause an engagement portion, which is configured to lock the striker, to enter the striker groove or to recede from the striker groove in accordance with a rotation of the latch main body; and a handle, which is made of resin, and which is configured to receive an operation for causing the latch main body to rotate in an unlatching direction in which the engagement portion recedes from the striker groove, and wherein the latch main body includes: a forcing meshing portion configured to come into engagement with the striker passing across the half opening position and moving to the totally closing position and to be pressed in a latching direction, which is opposite to the unlatching direction, by the striker in a case that the engagement portion recedes from the striker groove; and a mounting portion provided adjacent to the forcing meshing portion, the handle being mounted on the mounting portion.

Advantageous Effect of Invention

According to the present invention, the hood lock device can be provided which has the superior durability and which can reduce the production costs.

DESCRIPTION OF EMBODIMENTS

Figure 1:
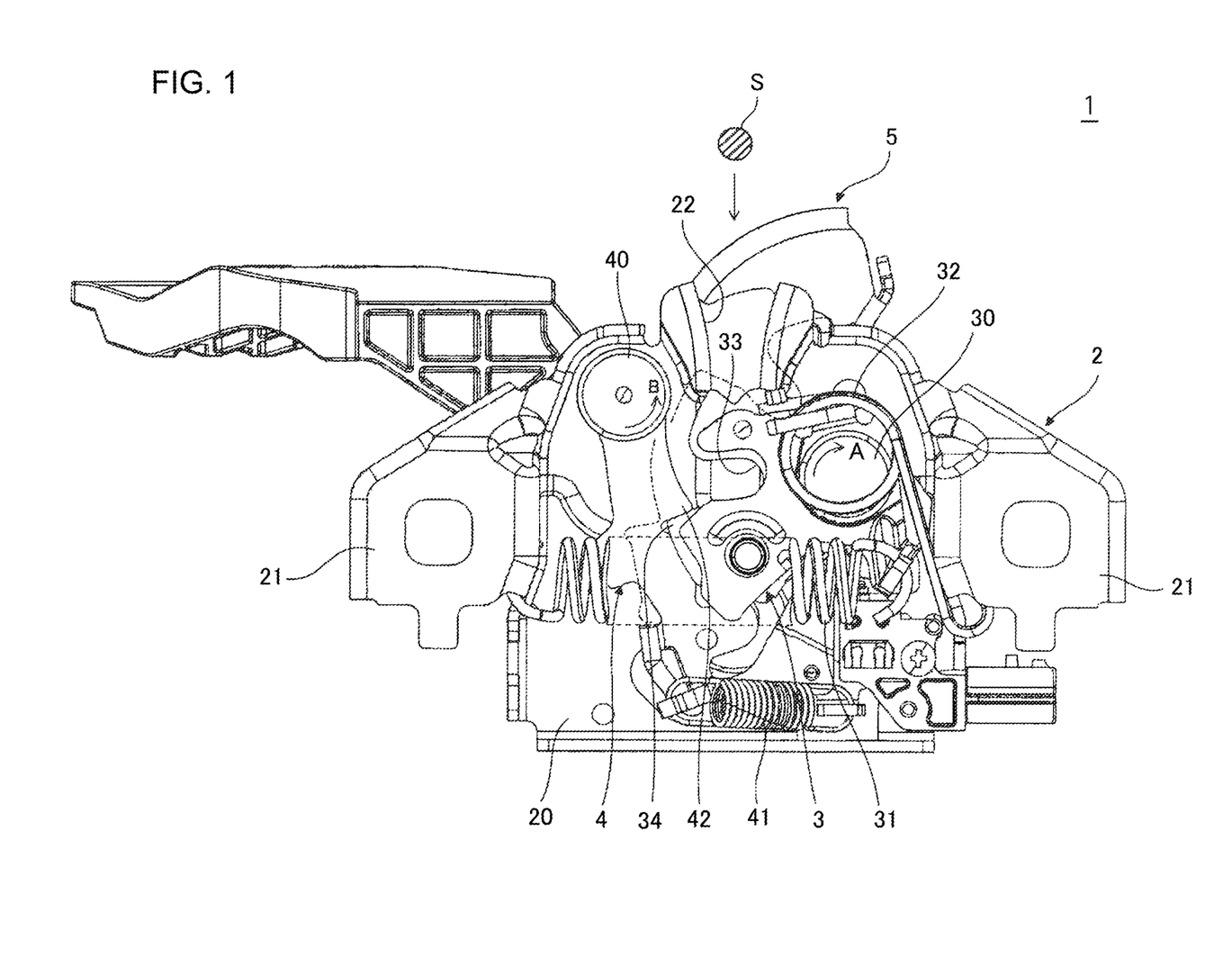
FIG. 1 is a front view of an example of a hood lock device to describe an embodiment of the present invention.
Figure 2:
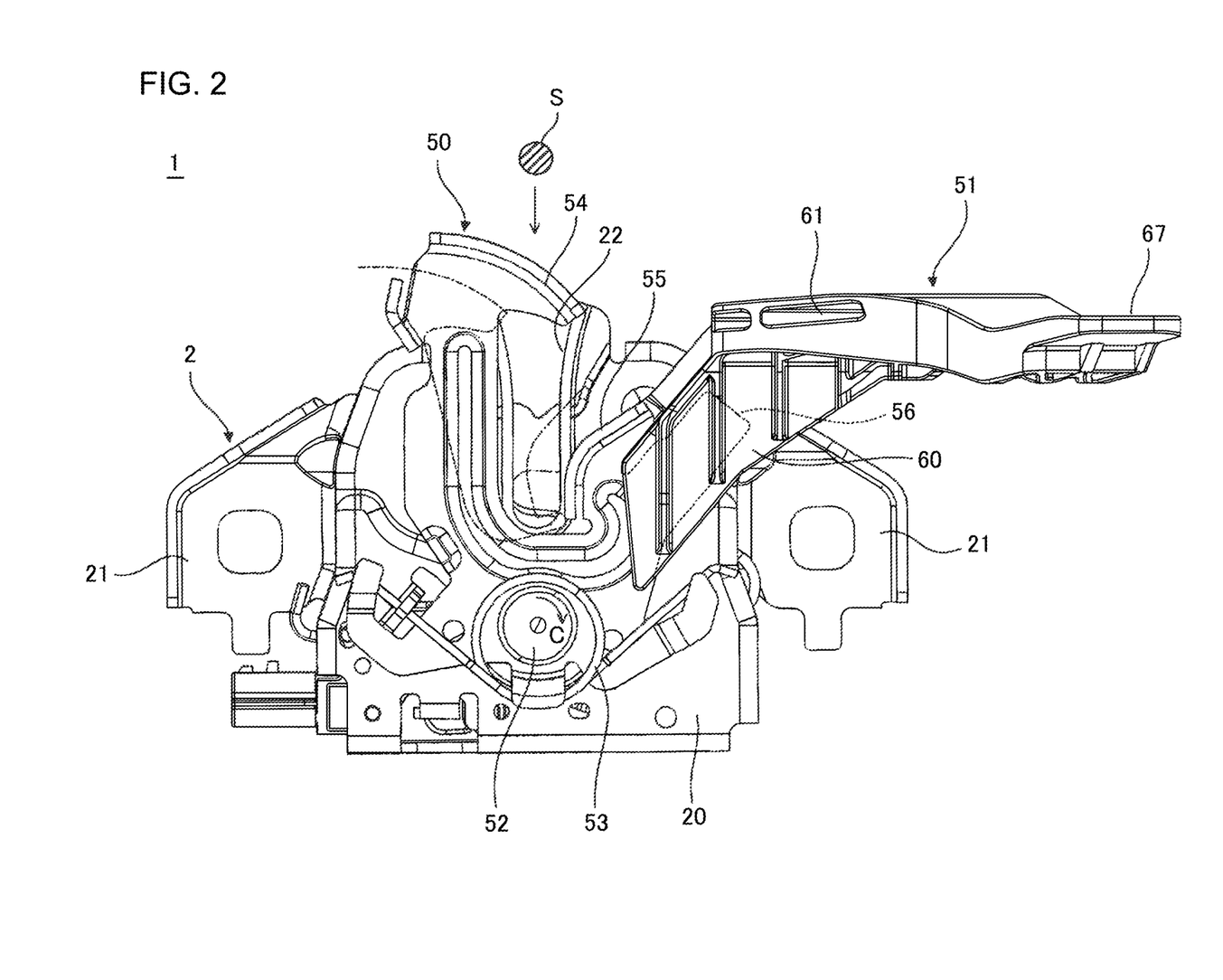
FIG. 2 is a rear view of the hood lock device shown in FIG. 1.

FIGS. 1 and 2 show an example of a hood lock device to describe an embodiment of the present invention.

A hood lock device 1 is placed in, for example, an engine compartment of a vehicle to fasten a hood of the engine compartment by locking a striker S provided on the hood. This hood lock device 1 includes a base plate 2, a primary latch 3, a ratchet 4, and a secondary latch 5.

The base plate 2 has a plate-shaped main body portion 20 and a pair of left and right fixing portions 21 that are to be fixed to a vehicle body. A striker groove 22 is provided in the main body portion 20, so that the striker S enters the striker groove 22 as the hood is closed, whereas the striker S exits from the striker groove 22 as the hood is opened.

The primary latch 3 is disposed on a primary surface side of the main body portion 20 of the base plate 2. The primary latch 3 is supported rotatably by a latch shaft 30 provided on the main body portion 20 in such a manner as to be erected therefrom, whereby the primary latch 3 rotates between a primary latching position shown by a solid line in FIG. 1 and a primary unlatching position shown by an alternate long and short dash line in FIG. 1. Then, the primary latch 3 is biased in the direction of an arrow A towards the primary unlatching position by means of a coil spring 31 and a torsion spring 32.

The primary latch 3 has a locking groove 33 for locking the striker S. When the primary latch 3 is placed in the primary unlatching position, an opening of the locking groove 33 coincides with the striker groove 22 in the base plate 2. In this case, the striker S can enter the striker groove 22 and the locking groove 33 and exit from the striker groove 22 and the locking groove 33.

The locking groove 33 extends in a direction in which the locking groove 33 intersects the striker groove 22, and when the striker S enters the striker groove 22 and the locking groove 33, the striker S then moves towards a deep portion of the striker groove 22 while pressing one side wall of the locking groove 33. The primary latch 3, which is being pressed by the striker S, is rotated towards the primary latching position. The opening of the locking groove 33 is closed by one side wall of the striker groove 22 as a result of the primary latch 3 being rotated towards the primary latching position. The striker S is restrained on four sides thereof by both side walls of the striker groove 22 and both side walls of the locking groove 33.

When it is placed in the primary latching position, the primary latch 3 engages with the ratchet 4 and is then retained in the primary latching position against the biasing effort of the coil spring 31 and the torsion spring 32. An engagement portion 34, which is configured to be brought into engagement with the ratchet 4, is provided at an end portion of the opening of the locking groove 33.

The ratchet 4 is disposed on the primary surface side of the main body portion 20 of the base plate 2. The ratchet 4 is supported rotatably by a ratchet shaft 40 provided on the main body portion 20 in such a manner as to be erected therefrom, so that the ratchet 4 is rotated between a locking position shown by a solid line in FIG. 1 and an unlocking position shown by a chain double-dashed line in FIG. 1. Then, the ratchet 4 is biased by a coil spring 41 in the direction of an arrow B towards the locking position.

The ratchet 4 has an engagement portion 42 configured to be brought into engagement with the engagement portion 34 of the primary latch 3. When the primary latch 3 reaches the primary latching position, the ratchet 4, which is being biased by the coil spring 41, is automatically rotated towards the locking position, whereby the engagement portion 42 of the ratchet 4, which is now being positioned in the locking position, is brought into engagement with the engagement portion 34. As a result of the engagement of the engagement portion 34 with the engagement portion 42, the primary latch 3 is prevented from rotating towards the primary unlatching position, whereby the primary latch 3 is retained in the primary latching position. The striker S is restrained on the four sides thereof by the two side walls of the striker groove 22 and the two side walls of the locking groove 33, whereby the striker S is locked in a totally closing position at a deep portion of the striker groove 22. According thereto, the hood is held in a totally closed state.

The ratchet 4 is connected to a hood lever provided in a passenger compartment of the vehicle via a wire, not shown, and is rotated towards the unlocking position in response to an operation of the hood lever. When the ratchet 4 is rotated towards the unlocking position, the engagement between the engagement portion 34 and the engagement portion 42 is released. The primary latch 3, which is biased by the coil spring 31 and the torsion spring 32, is rotated towards the primary unlatching position, and the primary latch 3 pushes up the striker S towards an opening side of the striker groove 22 when it is so rotated. This causes the hood to pop up.

The secondary latch 5 is disposed on a secondary surface side of the main body portion 20 of the base plate 2. The secondary latch 5 includes a latch main body 50 made of steel and a handle 51 made of resin. The latch main body 50 is supported rotatably by a secondary latch shaft 52 provided on the main body portion 20 in such a manner as to be erected therefrom, and is rotated between a secondary latching position shown by a solid line in FIG. 2 and a secondary unlatching position shown by an alternate long and short dash line in FIG. 2. Then, the secondary latch 5 is biased in the direction of an arrow C towards the secondary latching position by means of a torsion spring 53. The handle 51 is mounted on the latch main body 50 and is rotated together with the latch main body 50.

The latch main body 50 has a hook portion (a locking portion) 54 configured to lock the striker S. In a case that the latch main body 50 is placed in the secondary latching position, the hook portion 54 enters the opening of the striker groove 22. On the other hand, in a case that the latch main body 50 is placed in the secondary unlatching position, the hook portion 54 recedes from the opening of the striker groove 22. The latch main body 50, which is biased by the torsion spring 53, is basically placed in the secondary latching position, and the hook portion 54 basically enters the opening of the striker groove 22.

The striker S is brought into abutment with an external surface of the hook portion 54 before the striker S enters the striker groove 22 in response to a closing action of the hood. The external surface of the hook portion 54 is inclined from a moving direction of the striker S, and the latch main body 50 is pressed by the striker S, whereby the latch main body 50 is rotated in an unlatching direction (in a direction in which the latch main body 50 is rotated from the secondary latching position to the secondary unlatching position). As a result, the hook portion 54 recedes from the opening of the striker groove 22, thereby enabling the striker S to enter the striker groove 22. Then, when the striker S enters the striker groove 22, the latch main body 50, which is biased by the torsion spring 53, is rotated in a latching direction (a direction in which the latch main body 50 is rotated from the secondary unlatching position to the secondary latching direction), whereby the latch main body 50 is placed in the secondary latching position again. Thereafter, when the hood is caused to pop up, the striker S, which is pushed up towards the opening side of the striker groove 22, is brought into abutment with an internal surface of the hook portion 54, which now enters the opening of the striker groove 22, whereby the striker S is locked in a half opening position in an opening portion of the striker groove 22. As a result, the hood is fastened or retained in a half opened state.

The latch main body 50 further has a forcing meshing portion 55. In a case that the latch main body 50 is secured in the secondary unlatching position, the forcing meshing portion 55 forces the latch main body 50 to rotate in the latching direction in response to a closing action of the hood. To oppose the action of the hook portion 54, the forcing meshing portion 55 enters a middle portion of the striker groove 22 when the latch main body portion 50 is placed in the secondary latching position, whereas the forcing meshing portion 55 recedes from the middle portion of the striker groove 22 when the latch main body 50 is placed in the secondary unlatching position.

Assuming that the latch main body 50 is placed in the secondary unlatching position, the striker S, which now enters the striker groove 22 in response to the closing action of the hood, moves towards the deep portion of the striker groove 22 while pressing the forcing meshing portion 55, which now enters the middle portion of the striker groove 22. As a result of being pressed by the striker S, the latch main body 50 is rotated in the latching direction. As a result, the hook portion 54 enters the opening of the striker groove 22. Thereafter, when the hood is caused to pop up, the hood is then fastened or retained in the half opened state by the latch main body 50.

An operation attempting to rotate the latch main body 50 in the unlatching direction is inputted into the handle 51. When the handle 51 is operated with the hood being retained in the half opened state, causing the latch main body 50 to rotate in the unlatching direction, the hook portion 54 recedes from the opening of the striker groove 22, whereby the engagement between the hook portion 54 and the striker S is released. As a result, the hood can be opened fully. The handle 51 is mounted on a mounting portion 56 of the latch main body 50. The mounting portion 56 extends from the forcing meshing portion 55 into a tongue-like shape along the main body portion 20 of the base plate 2. The handle 51 has a connecting portion 60 which is connected to the mounting portion 56 of the latch main body 50.

When a hood closing speed is excessively great or fast in closing the hood, the latch main body 50 is rotated in the unlatching direction based on an abutment of the striker S with the hook portion 54, and immediately after the latch main body 50 is so rotated, the latch main body 50 is forced to rotate in the latching direction not by means of the torsion spring 53 but by an abutment of the striker S with the forcing meshing portion 55. The rotational directions of the latch main body 50 and the handle 51 are reversed from the unlatching direction to the latching direction at the moment of the abutment of the striker S with the forcing meshing portion 55, whereby an impact is caused to act on the connecting portion 60 of the handle 51.

Here, a rotational motion produced when the rotational direction of the handle 51 is reversed from the unlatching direction to the latching direction can be regarded as a rotational motion produced about the forcing meshing portion 55 which is brought into abutment with the striker S. The energy of motion of the handle 51 relates to a distance from the forcing meshing portion 55, and the mounting portion 56 to which the connecting portion 60 is connected is provided adjacent to the forcing meshing portion 55. As a result, the energy of motion required to reverse the rotational direction of the handle 51 is made as small as possible, whereby the impact acting on the connecting portion 60 is alleviated. This serves to enhance the durability of the hood lock device 1.

Figure 3:
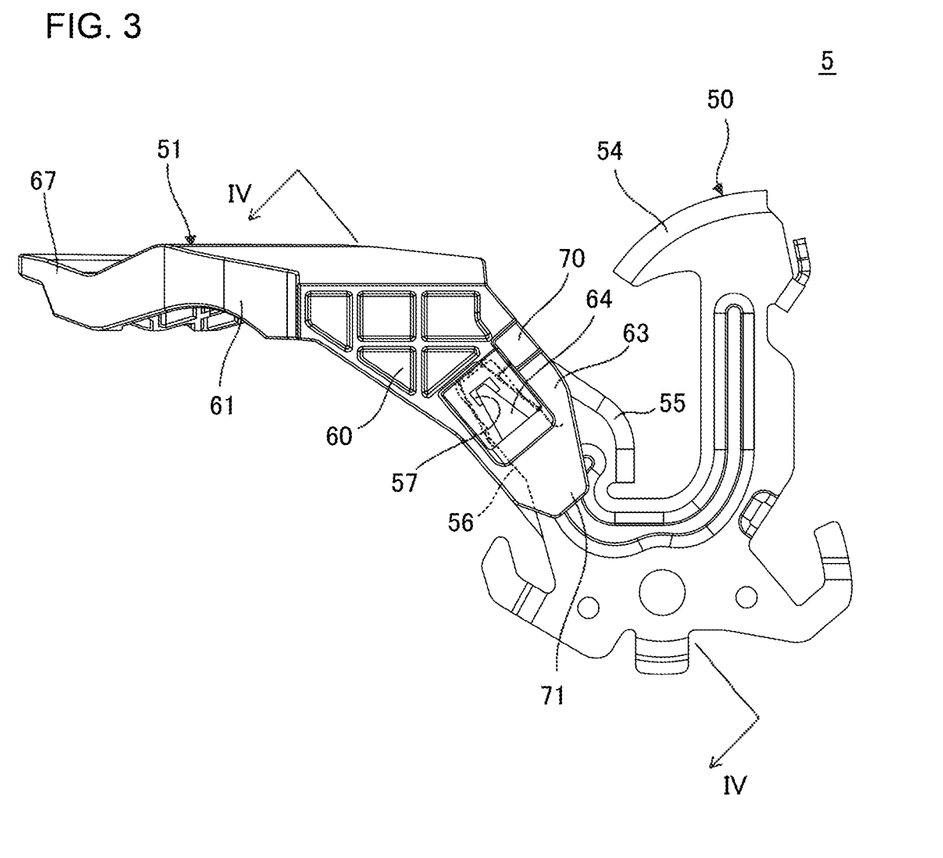
FIG. 3 is a front view of a secondary latch of the hood lock device shown in FIG. 1.
Figure 4:
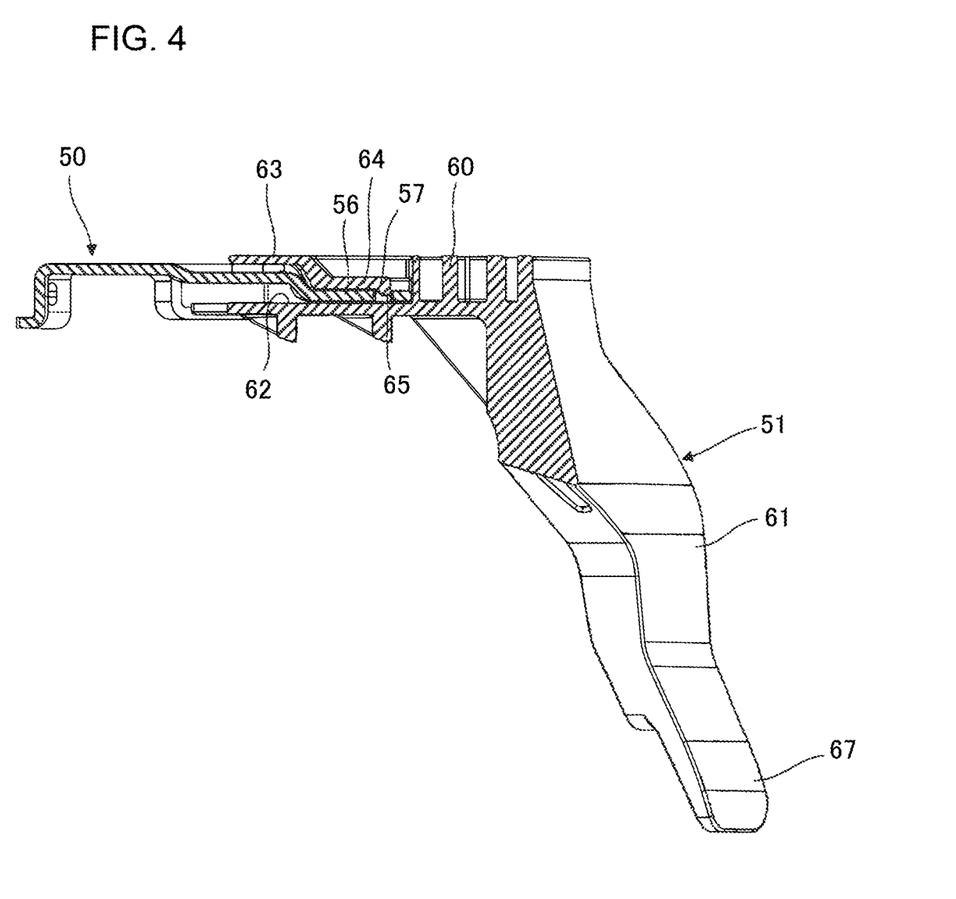
FIG. 4 is a sectional view of the secondary latch shown in FIG. 3 taken along a line IV-IV.

FIGS. 3 and 4 show the secondary latch 5.

The handle 51 has a handle portion 61 extending from the connecting portion 60.

The connecting portion 60 has a slot 62, into which the mounting portion 56 is inserted. The mounting portion 56 has a tongue shape. The mounting portion 56 extends along the main body portion 20 of the base plate 2, as a result of which the connecting portion 60 is connected to the mounting portion 56 along the main body portion 20. An elastic piece 64 is provided on a wall portion 63, in wall portions surrounding the slot 62, which is disposed in such a manner as to face the main body portion 20 of the base plate 2. The elastic piece 64 configures a part of the wall portion 63 which is divided therefrom by a substantially V-shaped cut made therein, and a proximal end portion of the elastic piece 64 is connected to the wall portion 63. A projecting portion 65 is provided at a distal end portion of the elastic piece 64 in such a manner as to project inwards of the slot 62, while a recessed portion 57 is provided on the mounting portion 56 configured to be inserted into the slot 62. The connecting portion 60 is fixedly connected to the mounting portion 56 as a result of the mounting portion 56 being inserted into the slot 62 and the projecting portion 65 and the recessed portion 57 being fitted together.

The handle portion 61 is bent substantially at right angles to the connecting portion 60. As a result, the handle portion 61 extends in a direction in which the handle portion 61 intersects the main body portion 20 of the base plate 2. An operation input portion 67 is provided at a distal end portion of the handle portion 61, and the operation input portion 67 has an input surface which is directed downwards with the hood lock device 1 placed in the engine compartment. The shape of the handle portion 61 such as an extending direction and a length thereof and the direction of the input surface of the operation input portion 67 are set as required in accordance with a vehicle type to which the hood lock device 1 is applied.

Figure 5:
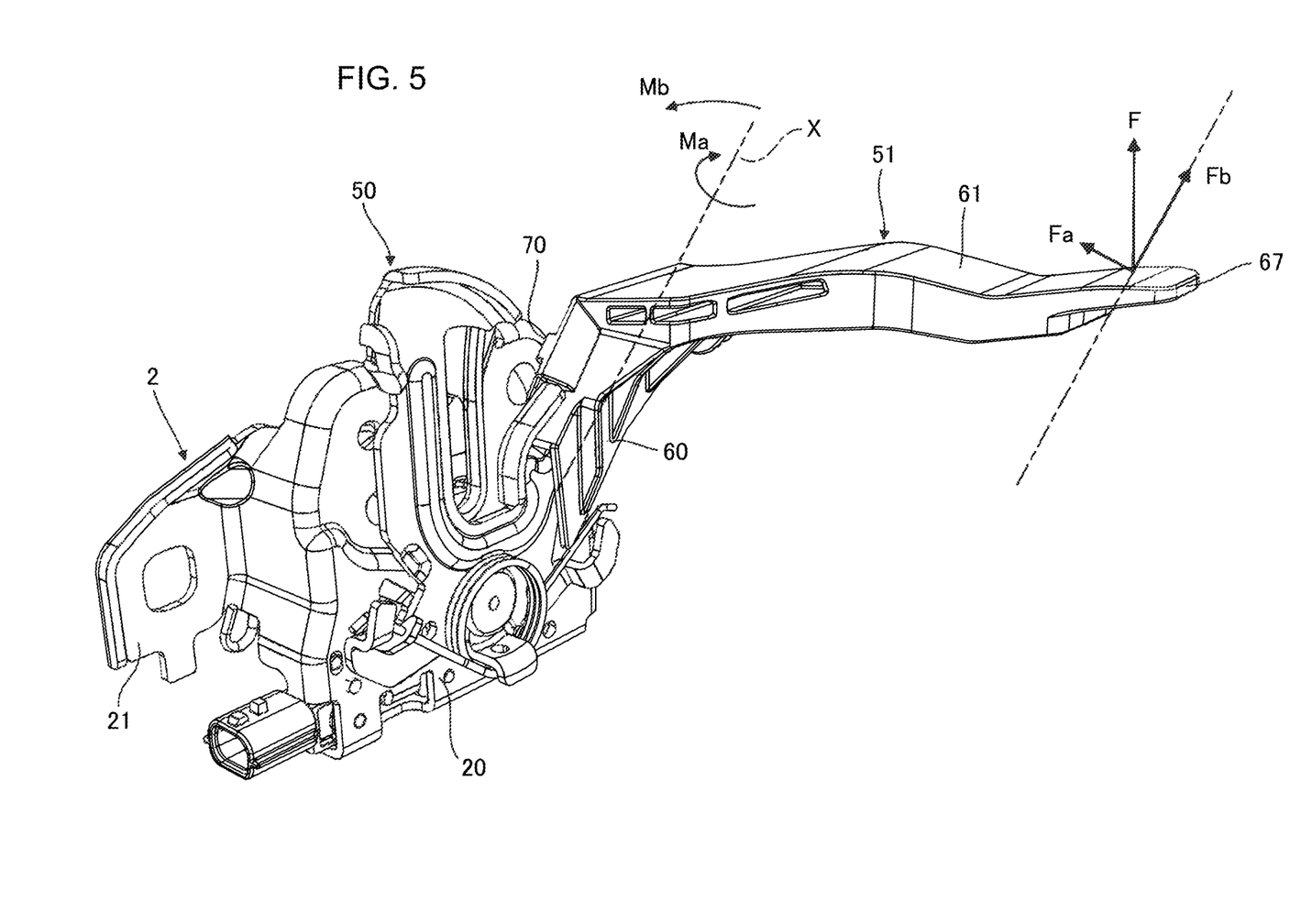
FIG. 5 is a schematic diagram showing moments generated in the secondary latch shown in FIG. 3.
Figure 6:
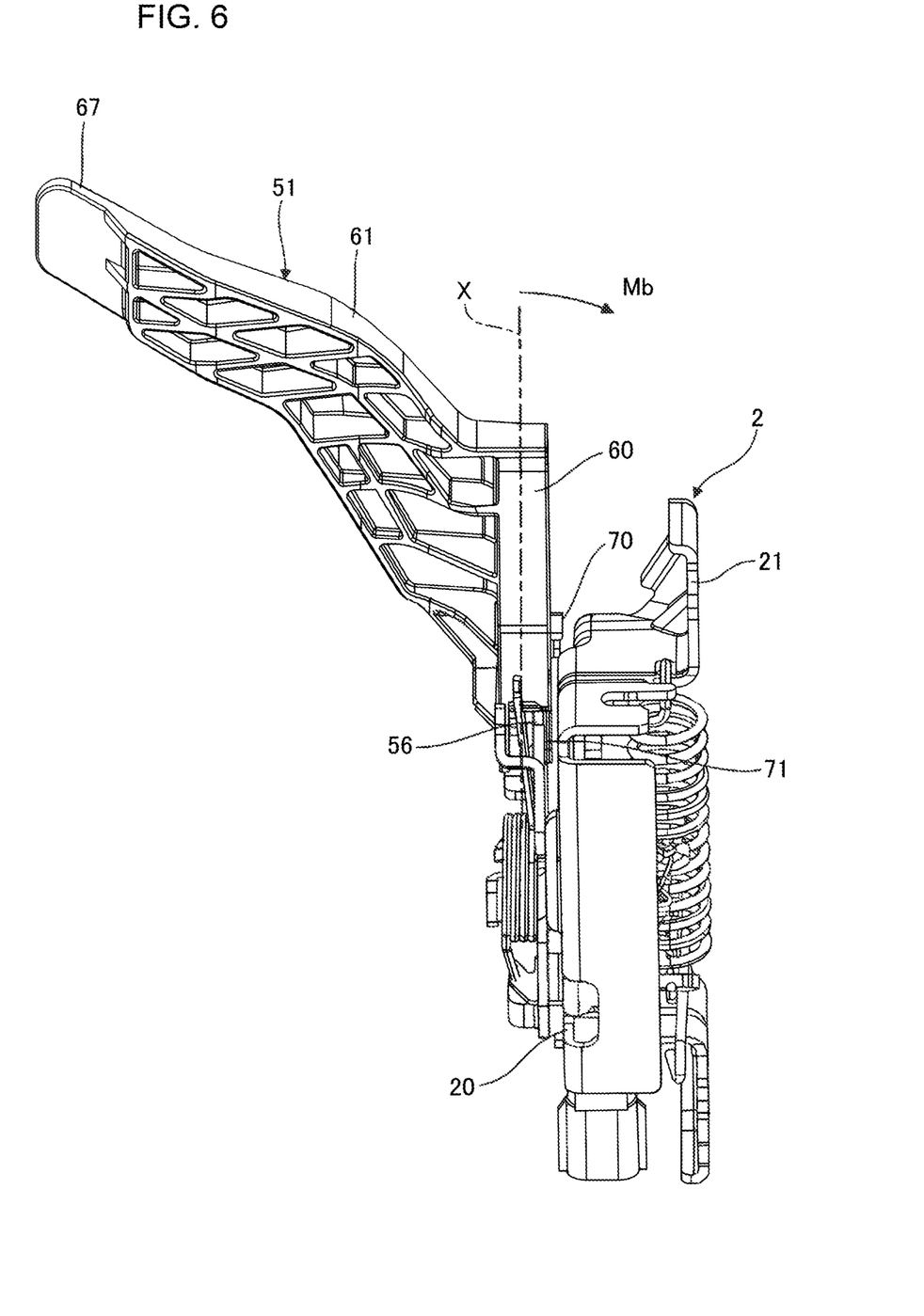
FIG. 6 is a schematic diagram showing a moment generated in the secondary latch shown in FIG. 3.

As shown in FIGS. 5 and 6, attributing to the configuration in which the connecting portion 60 and the operation input portion 67 are spaced apart from each other by way of the handle portion 61, a component Fa of an operation force F inputted into the operation input portion 67 which is at right angles to an axis X generates a torsion moment Ma about the axis X. In addition, of the operation force F, a component Fb which is parallel to the axis X generates a bending moment Mb. The torsion moment Ma and the bending moment Mb can be a factor damaging the connecting portion 60. Here, the axis X is a line that passes through the projecting portion 65 and the recessed portion 57, which are fitted together, and extends in a direction in which the mounting portion 56 and the connecting portion 60 are connected together. The handle 51 has a projecting portion 70 and a first extending portion 71 for the torsion moment Ma and the bending moment Mb, respectively.

The projecting portion 70 is provided on the wall portion 63 (refer to FIGS. 3, 4) of the connecting portion 60 in such a manner as to project towards the main body portion 20 of the base plate 2. A gap between the wall portion 63 of the connecting portion 60 and the main body portion 20 of the base plate 2 is narrowed by the projecting portion 70. In a case that torsion about the axis X is generated in the connecting portion 60 due to the torsion moment Ma, the projecting portion 70 is brought into abutment with the main body portion 20 of the base plate 2. As a result, the torsion of the connecting portion 60 is alleviated to thereby suppress the damage of the connecting portion 60. A plurality of projecting portions 70 may be provided on the wall portion 63.

The first extending portion 71 extends from the connecting portion 60 at an opposite side to the handle portion 61 and extends along a side of the mounting portion 56 of the latch main body 50 which faces the base plate 2 in the direction in which the mounting portion 56 and the connecting portion 60 are connected together. In a case that bending in which a side of the connecting portion 60 where the handle portion 61 is provided sinks towards the base plate 2 is generated in the connecting portion 60 due to the bending moment Mb, the first extending portion 71 is brought into abutment with the mounting portion 56. As a result, the bending of the connecting portion 60 is alleviated to thereby suppress the damage of the connecting portion 60.

Figure 7:
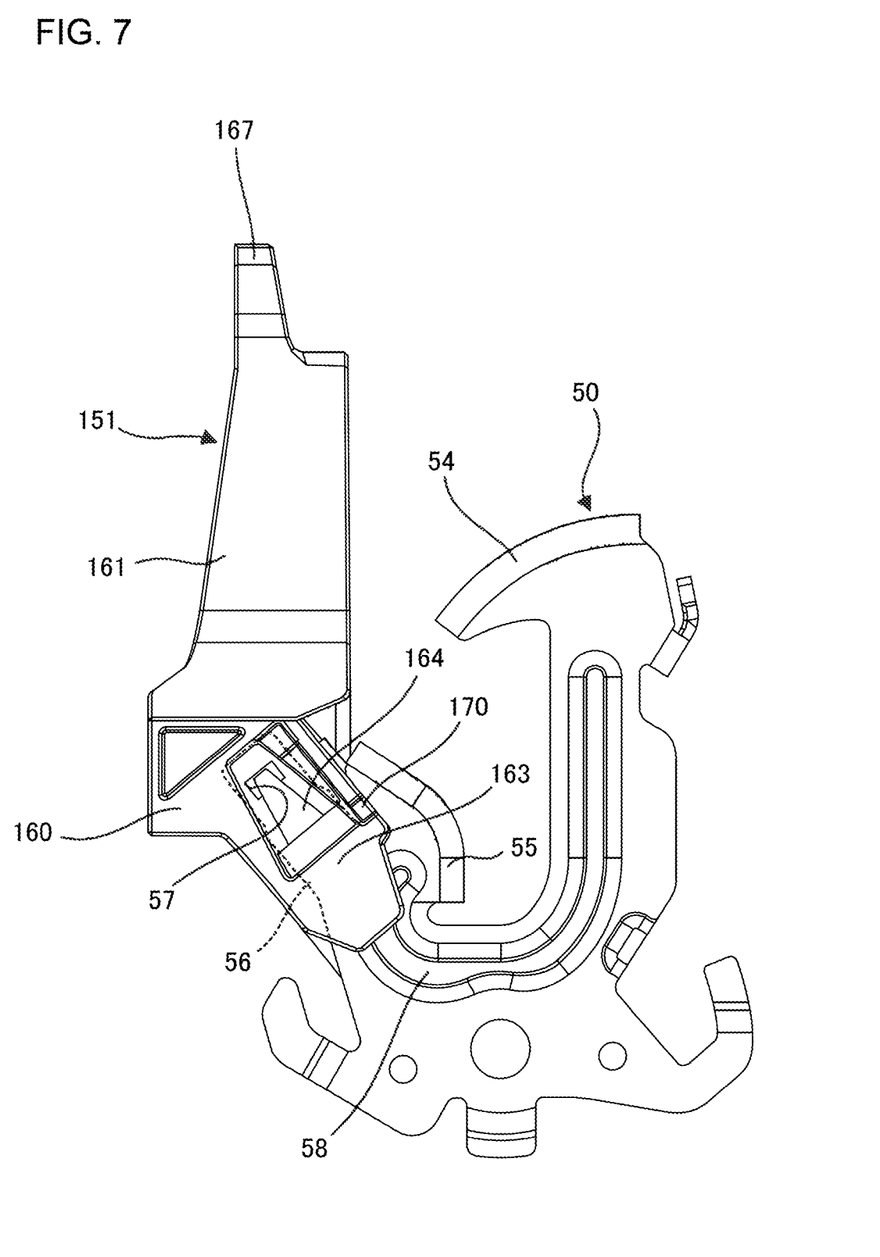
FIG. 7 is a front view of a modified example of the secondary latch shown in FIG. 3.

FIG. 7 shows a modified example of the handle 51.

A handle 151 shown in FIG. 7 has a connecting portion 160 which is connected to the mounting portion 56 of the latch main body 50 and a handle portion 161 extending from the connecting portion 160. The connecting portion 160 is configured similar to the connecting portion 60 of the handle 51 shown in FIGS. 3 and 4 and has a slot into which the mounting portion 56 is inserted and an elastic piece 164. A projecting portion, configured to be fitted in the recessed portion 57 of the mounting portion 56, is provided at a distal end portion of the elastic piece 164.

The handle portion 161 is bent substantially at right angles to the connecting portion 160. As a result, the handle portion 161 extends in a direction in which the handle portion 161 intersects the main body portion 20 of the base plate 20. An operation input portion 167 is provided at a distal end portion of the handle portion 161, and the operation input portion 167 has an input surface which is directed sideways with the hood lock device 1 placed in the engine compartment.

Figure 8:
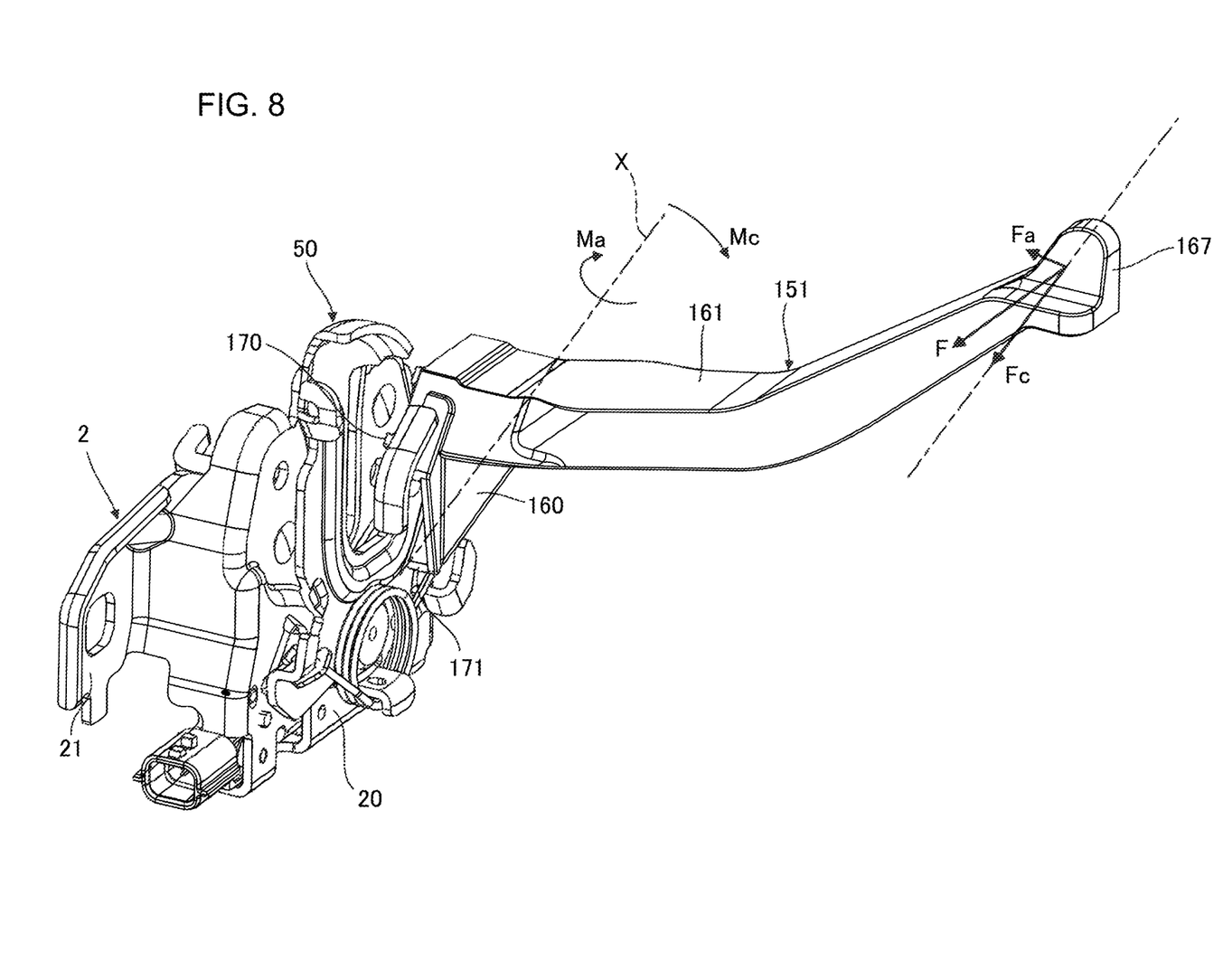
FIG. 8 is a schematic diagram showing moments generated in the secondary latch shown in FIG. 7.
Figure 9:
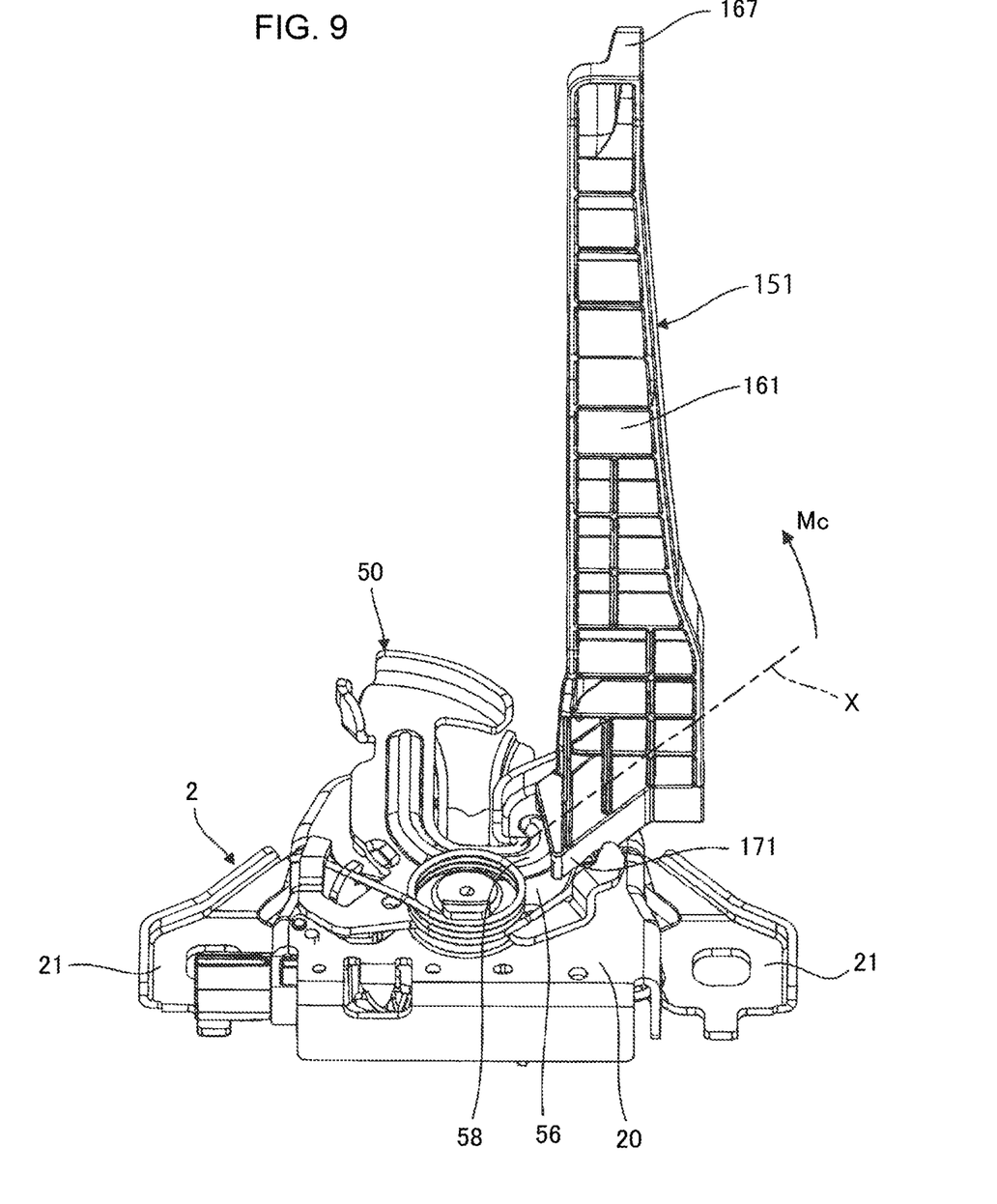
FIG. 9 is a schematic diagram showing a moment generated in the secondary latch shown in FIG. 7.

As shown in FIGS. 8 and 9, attributing to the configuration in which the connecting portion 160 and the operation input portion 167 are spaced apart from each other by way of the handle portion 161, a component Fa of an operation force F inputted into the operation input portion 167 which is at right angles to an axis X generates a torsion moment Ma about the axis X, and of the operation force F, a component Fc which is parallel to the axis X generates a bending moment Mc. The handle 151 has a projecting portion 170 and a second extending portion 171 for the torsion moment Ma and the bending moment Mc, respectively.

The projecting portion 170 is provided on a wall portion 163 (refer to FIG. 7) of the connecting portion 160 in such a manner as to project towards the main body portion 20 of the base plate 20. A gap between the wall portion 163 of the connecting portion 160 and the main body portion 20 of the base plate 2 is narrowed by the projecting portion 170. In a case that torsion about the axis X is generated in the connecting portion 160 due to the torsion moment Ma, the projecting portion 170 is brought into abutment with the main body portion 20 of the base plate 2. As a result, the torsion of the connecting portion 160 is alleviated to thereby suppress the damage of the connecting portion 160.

The second extending portion 171 extends from the connecting portion 160 at an opposite side to the handle portion 161 and extends along an opposite side to a side of the mounting portion 56 of the latch main body 50 which faces the base plate 2 in the direction in which the mounting portion 56 and the connecting portion 160 are connected together. In a case that bending in which a side of the connecting portion 160 where the handle portion 161 is provided moves away upwards from the base plate 2 is generated in the connecting portion 160 due to the bending moment Mc, the second extending portion 171 is brought into abutment with the mounting portion 56. As a result, the bending of the connecting portion 160 is alleviated to thereby suppress the damage of the connecting portion 160.

In this modified example, a bead 58 is provided on the mounting portion 56 in such a manner as to extend in the direction in which the mounting portion 56 and the connecting portion 160 are connected together, and the bead 58 projects towards the opposite side to the side of the mounting portion 56 which faces the base plate 2. In this case, a distal end portion of the second extending portion 171 is preferably bifurcated so as to straddle the bead 58 to be brought into abutment with the mounting portion 56.

Thus, as has been described heretofore, according to the disclosure of the present specification, there is provided a hood lock device including a base plate fixed to a vehicle body and having a striker groove into which a striker provided on a hood that is opened from and closed towards the vehicle body enters in response to a closing action of the hood, a primary latch configured to fasten the hood in a totally closed state by locking the striker in a totally closing position in the striker groove, and a secondary latch configured to fasten the hood in a half opened state by locking the striker in a half opening position situated closer to an opening side of the striker groove than the totally closing position, wherein the secondary latch has a latch main body of steel configured to be able to rotate relative to the base plate and to cause an engagement portion configured to lock the striker to enter the striker groove or to recede from the striker groove as the latch main body rotates, and a handle of resin into which an operation is inputted which causes the latch main body to rotate in an unlatching direction in which the engagement portion recedes from the striker groove, and wherein the latch main body has a forcing meshing portion configured to come into engagement with the striker passing across the half opening position and moving to the totally closing position to thereby be pressed in a latching direction opposite to the unlatching direction by the striker in a case that the engagement portion recedes from the striker groove, and a mounting portion provided adjacent to the forcing meshing portion and on which the handle is mounted.

In the hood lock device according to the disclosure of the present specification, the handle has a connecting portion connected to the mounting portion, the connecting portion has a slot into which the mounting portion is inserted and an elastic piece on which a projecting portion is provided in such a manner as to project inwards of the slot, and the mounting portion has a recessed portion in which the projecting portion fits.

In the hood lock device according to the disclosure of the present specification, the handle has a connecting portion connected to the mounting portion along the base plate, a handle portion extending from the connecting portion in a direction in which the handle portion intersects the base plate, and an operation input portion provided at a distal end portion of the handle portion, and a projecting portion is provided on the connecting portion in such a manner as to project towards the base plate.

In the hood lock device according to the disclosure of the present specification, the handle has a first extending portion extending from the connecting portion at an opposite side to the handle portion, and the first extending portion extends along a side of the mounting portion which faces the base plate in a direction in which the connecting portion and the mounting portion are connected together.

In the hood lock device according to the disclosure of the present specification, the handle portion has a second extending portion extending from the connecting portion at an opposite side to the handle portion, and the second extending portion extends along a side of the mounting portion which is opposite to a side thereof which faces the base plate in a direction in which the connecting portion and the mounting portion are connected together.

The present patent application is based on Japanese Patent Application (No. 2019-109674) filed on Jun. 12, 2019, the contents of which are incorporated herein by reference.

REFERENCE SIGNS LIST 1 hood lock device
2 base plate
3 primary latch
4 ratchet
5 secondary latch
20 main body portion
21 fixing portion
22 striker groove
30 latch shaft
31 coil spring
32 torsion spring
33 locking groove
34 engagement portion
40 ratchet shaft
41 coil spring
42 engagement portion
50 latch main body
51 handle
52 secondary latch shaft
54 hook portion (locking portion)
55 forcing meshing portion
56 mounting portion
57 recessed portion
58 bead
60 connecting portion
61 handle portion
62 slot
63 wall portion
64 elastic piece
65 projecting portion
67 operation input portion
70 projecting portion
71 first extending portion
151 handle
160 connecting portion
161 handle portion
163 wall portion
167 operation input portion
170 projecting portion
171 second extending portion
S striker

The invention claimed is:

1. A hood lock device comprising:
a base plate fixed to a vehicle body and having a striker groove into which a striker provided on a hood that is opened from and closed towards the vehicle body enters in response to a closing action of the hood;
a primary latch configured to fasten the hood in a totally closed state by locking the striker in a totally closing position in the striker groove; and
a secondary latch configured to fasten the hood in a half opened state by locking the striker in a half opening position situated closer to an opening side of the striker groove than the totally closing position,
wherein the secondary latch comprises:
a latch main body, which is made of steel, and which is rotatable relative to the base plate between a secondary latching position and a secondary unlatching position, the latch main body being configured to cause an engagement portion, which is configured to lock the striker, to enter the striker groove or to recede from the striker groove in accordance with a rotation of the latch main body, the engagement portion entering the striker groove in a case that the latch main body is placed in the secondary latching position, the engagement portion receding from the striker groove in a case that the latch main body is placed in the unlatching position; and
a handle, which is made of resin, and which is configured to receive an operation for causing the latch main body to rotate in an unlatching direction in which the engagement portion recedes from the striker groove, and
wherein the latch main body comprises:
a forcing meshing portion configured to come into engagement with the striker passing across the half opening position and moving to the totally closing position and to be pressed in a latching direction, which is opposite to the unlatching direction, by the striker in a case that the latch main body is placed at the secondary unlatching position and the engagement portion recedes from the striker groove; and
a mounting portion provided adjacent to the forcing meshing portion, the handle being mounted on the mounting portion,
wherein the handle comprises a connecting portion connected to the mounting portion,
wherein the mounting portion extends in a radial direction of a rotational axis of the secondary latch, and
wherein the connecting portion is connected to the mounting portion along the radial direction of the rotational axis of the secondary latch, and
wherein a projecting portion is provided on the connecting portion in such a manner as to project towards the base plate and brought into contact with the base plate to alleviate torsion on the connecting portion to suppress damage on the connecting portion.

2. The hood lock device according to claim 1,
wherein the connecting portion comprises:
a slot, the mounting portion being inserted into the slot; and
an elastic piece having the projecting portion projecting inwards of the slot,
wherein the mounting portion comprises a recessed portion, the projecting portion fitting in the recessed portion.

3. A hood lock device comprising:
a base plate fixed to a vehicle body and having a striker groove into which a striker provided on a hood that is opened from and closed towards the vehicle body enters in response to a closing action of the hood;
a primary latch configured to fasten the hood in a totally closed state by locking the striker in a totally closing position in the striker groove; and
a secondary latch configured to fasten the hood in a half opened state by locking the striker in a half opening position situated closer to an opening side of the striker groove than the totally closing position,
wherein the secondary latch comprises:
a latch main body, which is made of steel, and which is rotatable relative to the base plate between a secondary latching position and a secondary unlatching position, the latch main body being configured to cause an engagement portion, which is configured to lock the striker, to enter the striker groove or to recede from the striker groove in accordance with a rotation of the latch main body, the engagement portion entering the striker groove in a case that the latch main body is placed in the secondary latching position, the engagement portion receding from the striker groove in a case that the latch main body is placed in the unlatching position; and a handle, which is made of resin, and which is configured to receive an operation for causing the latch main body to rotate in an unlatching direction in which the engagement portion recedes from the striker groove, and wherein the latch main body comprises:
- a forcing meshing portion configured to come into engagement with the striker passing across the half opening position and moving to the totally closing position and to be pressed in a latching direction, which is opposite to the unlatching direction, by the striker in a case that the latch main body is placed at the secondary unlatching position and the engagement portion recedes from the striker groove; and
- a mounting portion provided adjacent to the forcing meshing portion, the handle being mounted on the mounting portion, wherein the handle comprises:
- a connecting portion connected to the mounting portion along the base plate;
- a handle portion extending from the connecting portion in a direction in which the handle portion intersects the base plate; and
- an operation input portion provided at a distal end portion of the handle portion, and wherein a projecting portion is provided on the connecting portion in such a manner as to project towards the base plate and brought into contact with the base plate to alleviate torsion on the connecting portion to suppress damage on the connecting portion.

4. The hood lock device according to claim 3, wherein the handle comprises a first extending portion extending from the connecting portion at an opposite side to the handle portion, and wherein the first extending portion extends along a side of the mounting portion which faces the base plate in a direction in which the connecting portion and the mounting portion are connected together.

5. The hood lock device according to claim 3, wherein the handle portion comprises a second extending portion extending from the connecting portion at an opposite side to the handle portion, and wherein the second extending portion extends along a side of the mounting portion which is opposite to a side thereof which faces the base plate in a direction in which the connecting portion and the mounting portion are connected together.

* * * * *